(12) United States Patent
Fraser et al.

(10) Patent No.: US 8,338,808 B2
(45) Date of Patent: Dec. 25, 2012

(54) ULTRAVIOLET RADIATION LAMP AND SOURCE MODULE AND TREATMENT SYSTEM CONTAINING SAME

(75) Inventors: Jim Fraser, St. Thomas (CA); Michael Sasges, Victoria (CA)

(73) Assignee: Trojan Technologies (CA)

( * ) Notice: Subject to any disclaimer, the term of this patent is extended or adjusted under 35 U.S.C. 154(b) by 546 days.

(21) Appl. No.: 11/915,154

(22) PCT Filed: May 15, 2006

(86) PCT No.: PCT/CA2006/000763
§ 371 (c)(1),
(2), (4) Date: Jul. 7, 2008

(87) PCT Pub. No.: WO2006/122394
PCT Pub. Date: Nov. 23, 2006

(65) Prior Publication Data
US 2009/0065413 A1 Mar. 12, 2009

Related U.S. Application Data

(60) Provisional application No. 60/682,809, filed on May 20, 2005.

(51) Int. Cl.
*A61N 5/06* (2006.01)
*G01J 3/10* (2006.01)
*H05G 2/00* (2006.01)

(52) U.S. Cl. .............. 250/504 R; 250/436; 250/497.1; 250/455.11; 250/423 R; 250/435; 315/94; 315/115; 210/175; 210/222; 210/232; 210/252; 210/748.11; 210/241; 313/11

(58) Field of Classification Search .............. 250/504 R, 250/436, 497.1, 455.11, 432 R, 435; 315/94, 315/115; 313/11; 210/175, 222, 232, 252, 210/748.11, 241
See application file for complete search history.

(56) References Cited

U.S. PATENT DOCUMENTS

| | | | |
|---|---|---|---|
| 3,309,565 A | 3/1967 | Clark, et al. | |
| 5,274,305 A | 12/1993 | Bouchard | |
| 6,217,834 B1 | 4/2001 | Hosein et al. | |
| 6,874,914 B2* | 4/2005 | Desanto et al. | 362/372 |
| 2004/0232846 A1* | 11/2004 | Fischer et al. | 315/94 |
| 2009/0090667 A1* | 4/2009 | Fraser et al. | 210/222 |

FOREIGN PATENT DOCUMENTS

| | | |
|---|---|---|
| CN | 2106418 U | 6/1992 |
| JP | 2004-82023 A | 3/2004 |

(Continued)

OTHER PUBLICATIONS

Office Action for Canadian Patent Application No. 2,609,683, with a mailing date of Feb. 2, 2010.

(Continued)

*Primary Examiner* — Jack Berman
*Assistant Examiner* — Meenakshi Sahu
(74) *Attorney, Agent, or Firm* — Katten Muchin Rosenman LLP (57) ABSTRACT

The present invention relates to an ultraviolet radiation lamp. The lamp comprises: (i) a substantially sealed cavity comprising a mercury-containing material; and (ii) a heating unit disposed exteriorly with respect to the cavity. The heating unit is disposed in contact with a first portion of the cavity comprising the mercury-containing material. The heating unit has adjustable heat output.

35 Claims, 5 Drawing Sheets

FOREIGN PATENT DOCUMENTS

WO 93/11557 A1 6/1993

OTHER PUBLICATIONS

First Office Action for People's Republic of China Patent Application 2006800262493, with a mailing date of Sep. 11, 2009.

Office Action and Supplementary Search Report for European Patent Application No. EP 06 74 1478, with a mailing date of Feb. 12, 2009.
International Search Report for the corresponding international application PCT/CA2006/000763 (2 pages).

* cited by examiner

ULTRAVIOLET RADIATION LAMP AND SOURCE MODULE AND TREATMENT SYSTEM CONTAINING SAME

FIELD OF THE INVENTION

In one of its aspects, the present invention relates to an ultraviolet radiation lamp. In another of its aspects, the present invention relates to a radiation source module comprising the ultraviolet radiation lamp. In another of its aspects, the present invention relates to a fluid treatment system comprising the ultraviolet lamp.

DESCRIPTION OF THE PRIOR ART

Fluid treatment systems are known generally in the art.

For example, U.S. Pat. Nos. 4,482,809, 4,872,980, 5,006, 244, 5,418,370, 5,539,210 and Re:36,896 (all in the name of Maarschalkerweerd and all assigned to the assignee of the present invention) all describe gravity fed fluid treatment systems which employ ultraviolet (UV) radiation.

Generally, such prior fluid treatment systems employ an ultraviolet radiation lamp to emit radiation of a particular wavelength or range of wavelengths (usually between 185 and 400 nm) to effect bacterial kill or other treatment of the fluid being treated. Many conventional ultraviolet radiation lamps are known as "low pressure" mercury lamps.

In recent years, the art in low pressure mercury lamps has evolved with the development of the so-called Low Pressure, High Output (LPHO) or amalgam UV radiation lamps. These lamps have found widespread use in UV radiation water treatment systems, particularly those used for treatment of municipal drinking water and wastewater. As used herein, the term "low pressure" UV radiation lamp is intended to encompass both UV radiations lamps generally, particularly conventional UV radiation lamps and LPHO UV radiation lamps.

In use, it is usually necessary that a "cold portion" be maintained in such lamps to act as a mercury reservoir for the lamp thereby maintaining an adequate mercury vapour pressure for efficient emission of ultraviolet radiation. The mercury reservoir may be liquid mercury or may be an amalgam of mercury and another material such as indium. If the "cold portion" temperature is not within a narrow temperature range, the mercury vapour pressure in the low pressure lamp may not be suitable for efficient generation of UV radiation. Specifically, too high or too low a "cold portion" temperature will result in loss of efficiency of emission of UV radiation. This can lead to inadequate treatment of the fluid being treated, particularly since the fluid temperature may vary and the power level and resulting temperature of the lamp may also vary.

When such mercury lamps are used in a fluid treatment system such as one of the specific systems described and illustrated in the Maarschalkerweerd patents referred to above, the necessary "cold portion" is achieved through heat exchange with the water being treated.

It is known in the art to use passive means to maintain the necessary "cold portion". For example, U.S. Pat. No. 6,217, 834 [Hosein et al.] teaches placement of a heat absorbing element on the exterior of the ultraviolet lamp as a passive means to create a "cold portion" in the lamp which allows for efficient emission of ultraviolet radiation. In use, the heat absorbing element in the present ultraviolet radiation lamp functions as a "heat sink" on the exterior surface of the lamp. As such, during use, the heat absorbing element removes heat from the area of the lamp with which it is in contact. The result is the creation of a "cold portion" on the interior surface of lamp (i.e., wherein the mercury vapour is contained) corresponding to that area. The mercury vapour condenses on the "cold portion" thereby resulting in efficient emission of ultraviolet radiation from the lamp.

It is also known to use passive control of a mercury reservoir (amalgam) through thermal conduction to lower temperature surroundings or structures, and to have this thermal connection vary with temperature with, for example, bimetallic elements—see, for example, U.S. Pat. No. 3,309,565.

It is also known to use an externally regulated heater to control the temperature of an over-cooled mercury reservoir—i.e., the reverse situation being addressed by Hosein et al. This approach requires the use of: (i) electrical power connections running from the heater to a power supply, and (ii) a sensor signal running from the heater to a power regulation device.

Ultraviolet radiation lamps are thermal devices that are increasingly being operated at higher power levels to provide increased ultraviolet radiation output, resulting in a need to control the increasing thermal conditions, in order to optimize the lamp efficiency. For example, some amalgam lamps can produce optimal UV output when the "cold portion" is in the range of 90° C. to 120° C.

Accordingly, there is an ongoing need in the art for a radiation lamp, particularly an ultraviolet radiation lamp, that incorporates active temperature control of an amalgam spot or mercury reservoir therein, but which does not require the complexity of external control circuitry. Ideally, such a radiation lamp could be run at or near optimum mercury pressure and therefore, at optimum efficiency, independently of the temperature of the fluid being treated, the power settings of the radiation source and/or the diameter of the outer protective sleeve.

SUMMARY OF THE INVENTION

It is an object of the present invention to obviate or mitigate at least one of the above-mentioned disadvantages of the prior art.

Accordingly, in one of its aspects, the present invention provides an ultraviolet radiation lamp comprising: (i) a substantially sealed cavity comprising a mercury-containing material; and (ii) a heating unit disposed exteriorly with respect to the cavity, the heating unit being disposed in contact with a first portion of the cavity comprising the mercury-containing material, the heating unit having adjustable heat output.

In another of its aspects, the present invention provides an ultraviolet radiation lamp comprising: (i) a substantially sealed cavity comprising a mercury-containing material; (ii) a heat absorbing element on the exterior thereof such that, during operation of the lamp, the temperature of the lamp in contact with the heat absorbing element is at a different temperature than the remainder of the lamp; and (iii) a heating unit disposed exteriorly with respect to the cavity, the heating unit being disposed in contact with a first portion of the cavity comprising the mercury-containing material.

In yet other of its aspects, the present invention relates to a radiation source assembly comprising the present ultraviolet radiation lamp.

In yet other of its aspects, the present invention relates to a radiation source module comprising the present ultraviolet radiation lamp.

In yet other of its aspects, the present invention relates to a fluid treatment system comprising the present ultraviolet radiation lamp.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

There are a number of preferred embodiments of the present invention. As will be apparent to those of skill in the art, a number of these embodiments relate to the use of a releasably engageable part of a lamp (or lamp socket) and a plug (or adaptor) therefore.

These preferred embodiments include the following.

Self regulating electric/electronic control on the (a) lamp/lamp socket, or (b) plug/adapter, or (c) "donut" (annular) element. A number of advantages accrue from this approach, including: (a) small package size, (b) no external wiring required for temperature sensing, (c) no external control device required, (d) solid state reliability, and (d) relatively inexpensive to construct.

A reusable thermal connection between a plug/adapter and the lamp/lamp socket. This connection may or may not be electrically conductive for other purposes other than direct cold-spot temperature control. This allows for cost saving advantages as well as reliability advantages.

Placing the active portion of the thermal control in the plug/adapter. This allows for cost saving advantages as well as reliability advantages over prior art approaches which have remote temperature regulation or in which the thermal control device is replaced each time the lamp is replaced.

Simple diagnostics on the plug/adapter. The use of an LED or other indicator to show ballast power is present, and a light pipe, etc. that points at the back of the bulb through the lamp socket to show the lamp is on, and, preferably an LED to show the preheat circuit and/or continuous filament heat circuit is working. This embodiment would allow a user to simply and locally determine operational status of their equipment. This is especially important and advantageous in drinking water applications. The lightpipe portion of this embodiment is also for enhanced safety; the user never has a need to pull the lamp to see if it is operating. In waste water applications a simple charged circuit could be used that that would enable the operator to determine if the lamp in question had had power recently. For example, if a ballast on a module has failed, the operator shuts down power to the module, then within period "x" examines the LEDs on the module. Any LED that is not lit indicates that power was not recently supplied to that lamp unit. A simple RC circuit can be implemented for this embodiment.

There are a number of variations on these preferred embodiments of the invention, including the following.

The heater and/or cooler may be a semi-permanent part of the system—i.e., the lamp rests on the thermal control device, that is affixed to the sleeve/reactor/etc., and is regulated via this device. This could be a combination of semi permanent heat sink elements, heaters, coolers and the like. These elements could be placed at either one or both ends of the sleeves, or at one or more intermediate positions along the sleeves. In this design the plug/socket and electrical connections for the lamp electrical power may not necessarily be physically part of the thermal control device(s). This could be used for lamps with amalgam feature either within the arc length (conventional spot amalgams for example) and out side of the arc length, i.e. pips, fill tubes or cavities in the pinch area of the lamp.

The lamp may have a combination of amalgam feature designs and types. Some amalgams may be passive and only one or two amalgams may have active control on a given lamp. This would allow the use of a passive amalgam for quick startup for example, then an active amalgam for normal running. The normal running amalgam would have the active thermal control.

This could be done with the thermal control devices at one or more locations on the lamp—i.e., both ends, one end, one or more portions along the lamp tube length or any combination thereof.

The passive (heater or cooler) and active components (heaters or coolers) can be situated on the lamp, plug, adapter or reactor components in many combinations.

No extra passive cooler needed.

An active cooler may be used—e.g., Peltier or a device that uses something like a heat pipe to regulate the amount of heat that is dissipated in a heatsink.

Passively overcool, then use an active heater that is linked to the thermal load of the lamp—i.e., a heat pipe/bimetal combination that uses lamp heat to bring up the amalgam temperature.

Use of a physical shield inside the lamp to thermally protect the amalgam from the lamp thermal load. This is in place of passive cooling of the amalgam. Then, the amalgam could be heated to the desired temperature as described above. This could also be done by physically placing the amalgam outside of the radiant path of the lamp arc and/or filament glow discharge—i.e., a convoluted gas path.

It is possible to use a thermal connection if the active heating or cooling device used has a flat, conical, curved or sloped shape. The thermal connection may be in line with the lamp arc, or of a radial nature—i.e., around the pinch or tube circumference.

The self regulating heater can be as described above, a thermistor based device or it may be an RTD (resistive thermal device). For more information, see www.atpsensor.com. The heater could also be a simplified version of this, using a thin wire or wires that increases in resistance as the temperature increases, thereby reducing heating.

Of course other variations will be apparent to those of skill in the art.

Figure 1:
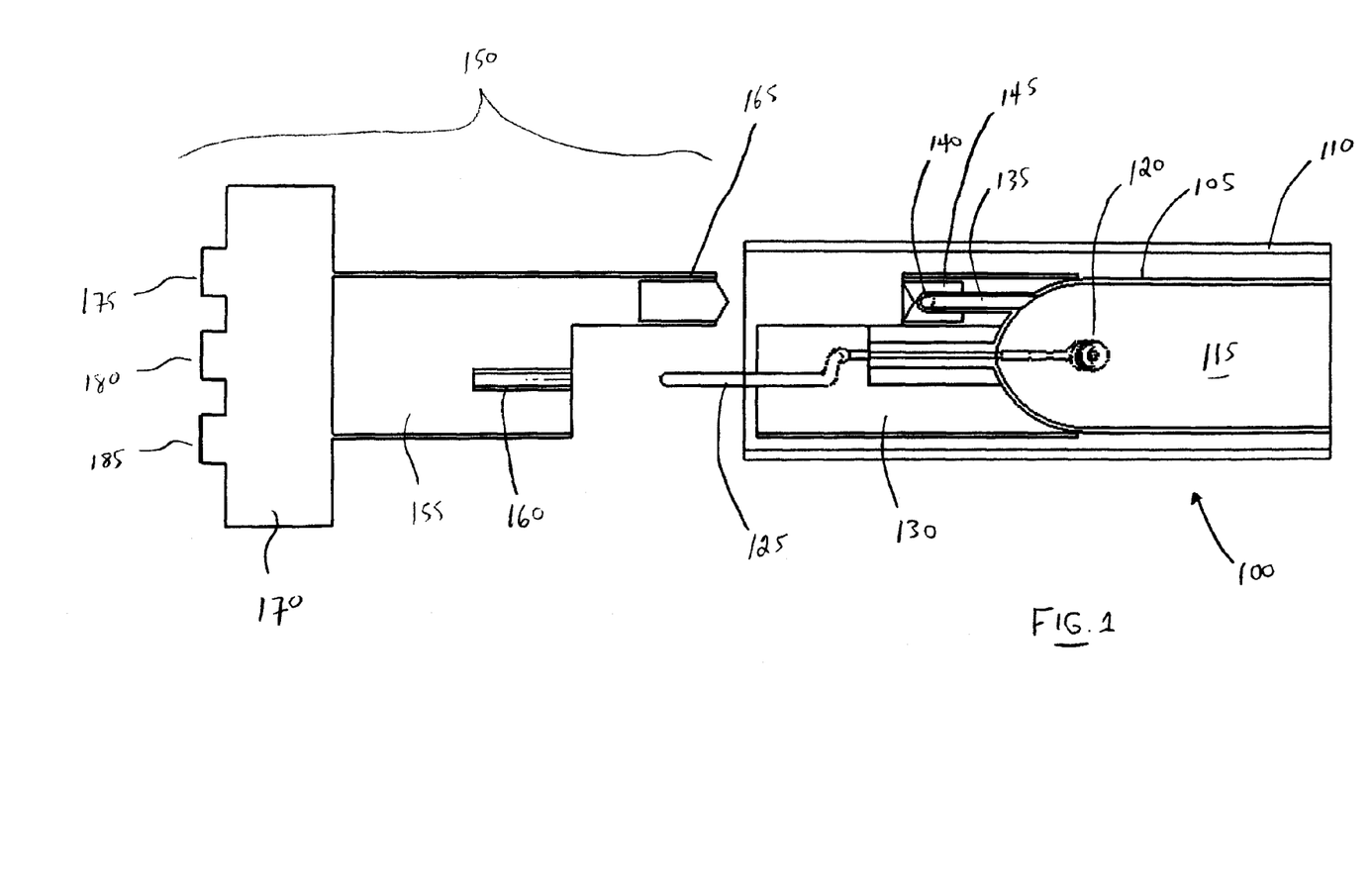
FIG. 1 illustrates an enlarged cross-sectional view of a first embodiment of the present ultraviolet radiation lamp disposed in a protective radiation transparent sleeve.

With reference to FIG. 1, there is illustrated a radiation source assembly 100 comprising an ultraviolet radiation lamp 105 and a protective radiation transparent sleeve 110.

Ultraviolet radiation lamp 105 comprises a substantially sealed cavity 115. Disposed at a proximal end of cavity 115 is a filament 120 which is in electrical connection with a electrical connecting pin 125. Those of skill in the art will recognize that, while only a single connecting pin 125 is shown, ultraviolet radiation lamp 105 will comprise a plurality of connecting pins (e.g., 2 or 4). The other connecting pin(s) is (are) not shown for clarity.

Also disposed at a proximal end of cavity 115 is a heat absorbing unit 130. The nature of heat absorbing unit 130 is not particularly restricted provided the material used for heat absorbing unit 130 is capable of conducting heat (e.g., operating as a heat sink). For example, heat absorbing unit 130 may be constructed of a material selected from the group comprising copper, aluminum, ceramic and the like.

Also disposed at the proximal end of cavity 115 is a passageway 135 in communication with cavity 115. Passageway 135 has disposed therein a mercury-containing material 140. Preferably, mercury-containing material 140 comprises elemental mercury. Surrounding a portion of passageway 135 is a thermal connector 145 which is made from a heat conductive material.

With further reference to FIG. 1, there is illustrated a plug (or adaptor) 150 comprising a housing 155. Housing 155 comprises an electrical receptacle 160 and a heating element 165. Housing 155 may also have disposed therein electrical components (not shown for clarity) for operation and/or control of heating element 165.

Located at the proximal end of plug 150 is base 170 having three light emitting diodes (LED's) 175,185 which may be used provide visual diagnostics and the like. For, example LED 175 may be used to indicate ballast power and LED 185 may be used to indicate that heating element 165 is operating properly. Also disposed in base 170 is a light pipe 180 indicating that lamp 105 is powered.

In use, plug 150 is mated with heat absorbing unit 130 such that electrical connecting pin 125 is inserted in electrical receptacle 160 and heating element 165 is in contact with thermal connector 145.

Figure 2:
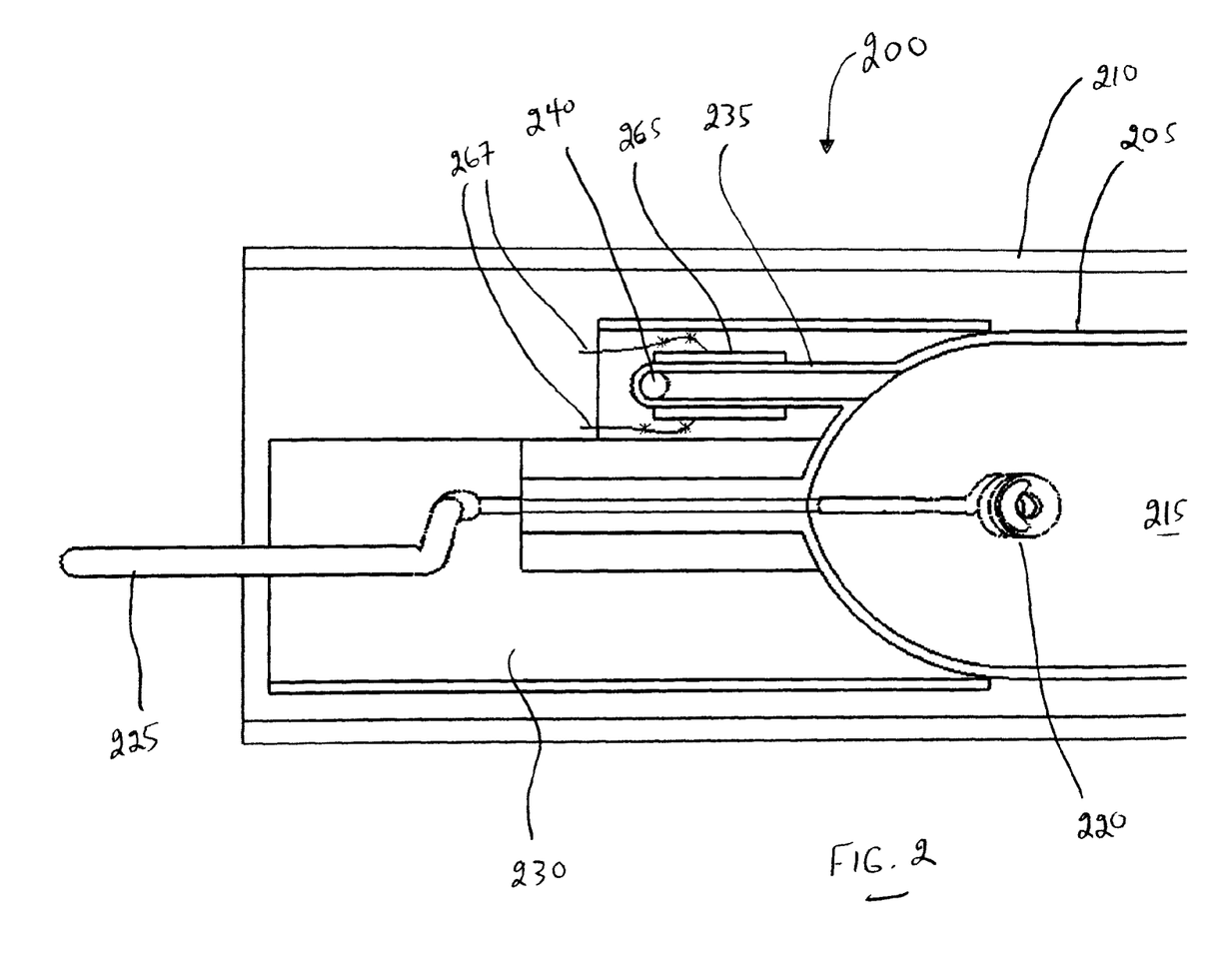
FIG. 2 illustrates an enlarged cross-sectional view of a second embodiment of the present ultraviolet radiation lamp disposed in a protective radiation transparent sleeve.
Figure 3:
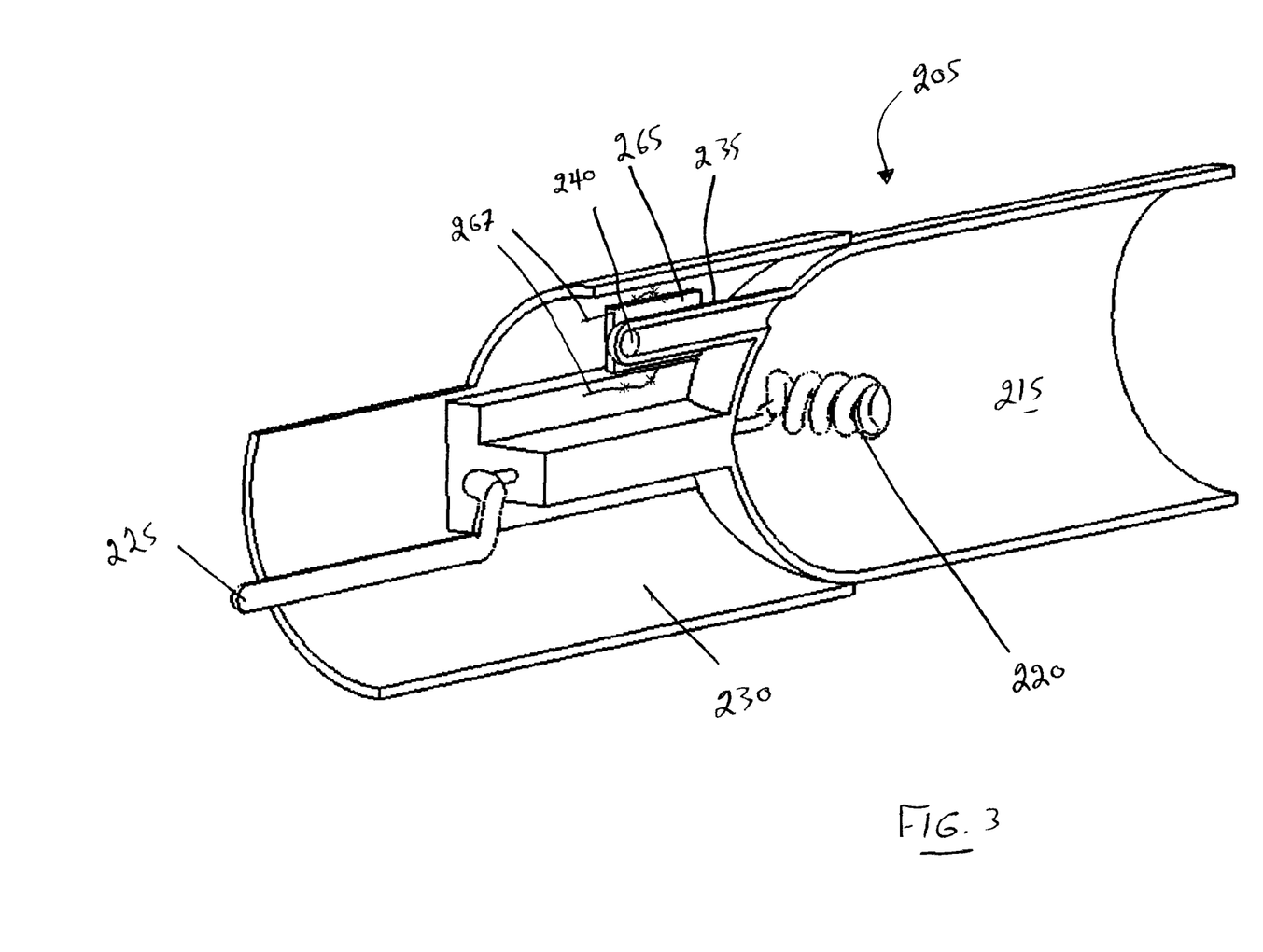
FIG. 3 illustrates an enlarged perspective view (partially cut away) of the ultraviolet radiation lamp illustrated in FIG. 2.

With reference to FIGS. 2 and 3, there is illustrated a radiation source assembly 200 comprising an ultraviolet radiation lamp 205 and a protective radiation transparent sleeve 210.

Ultraviolet radiation lamp 205 comprises a substantially sealed cavity 215. Disposed at a proximal end of cavity 215 is a filament 220 which is in electrical connection with an electrical connecting pin 225.

Also disposed at a proximal end of cavity 215 is a heat absorbing unit 230. The nature of heat absorbing unit 230 is not particularly restricted provided the material used for heat absorbing unit 230 is capable of conducting heat (e.g., operating as a heat sink). For example, heat absorbing unit 230 may be constructed of a material selected from the group comprising copper, aluminum, ceramic and the like.

Also disposed at the proximal end of cavity 215 is a passageway 235 in communication with cavity 215. Passageway 235 has disposed therein a mercury-containing material 240. Preferably, mercury-containing material 240 comprises mercury. Surrounding a portion of passageway 235 is a heating element 265. Connected to heating element 265 are a pair of electrical leads 267.

In use, electrical connecting pin 225 may be inserted in an electrical receptacle of a conventional socket or plug (not shown). Further, electrical leads 267 may be connected to appropriate circuitry to operate and/or control heating element 265.

Figure 4:
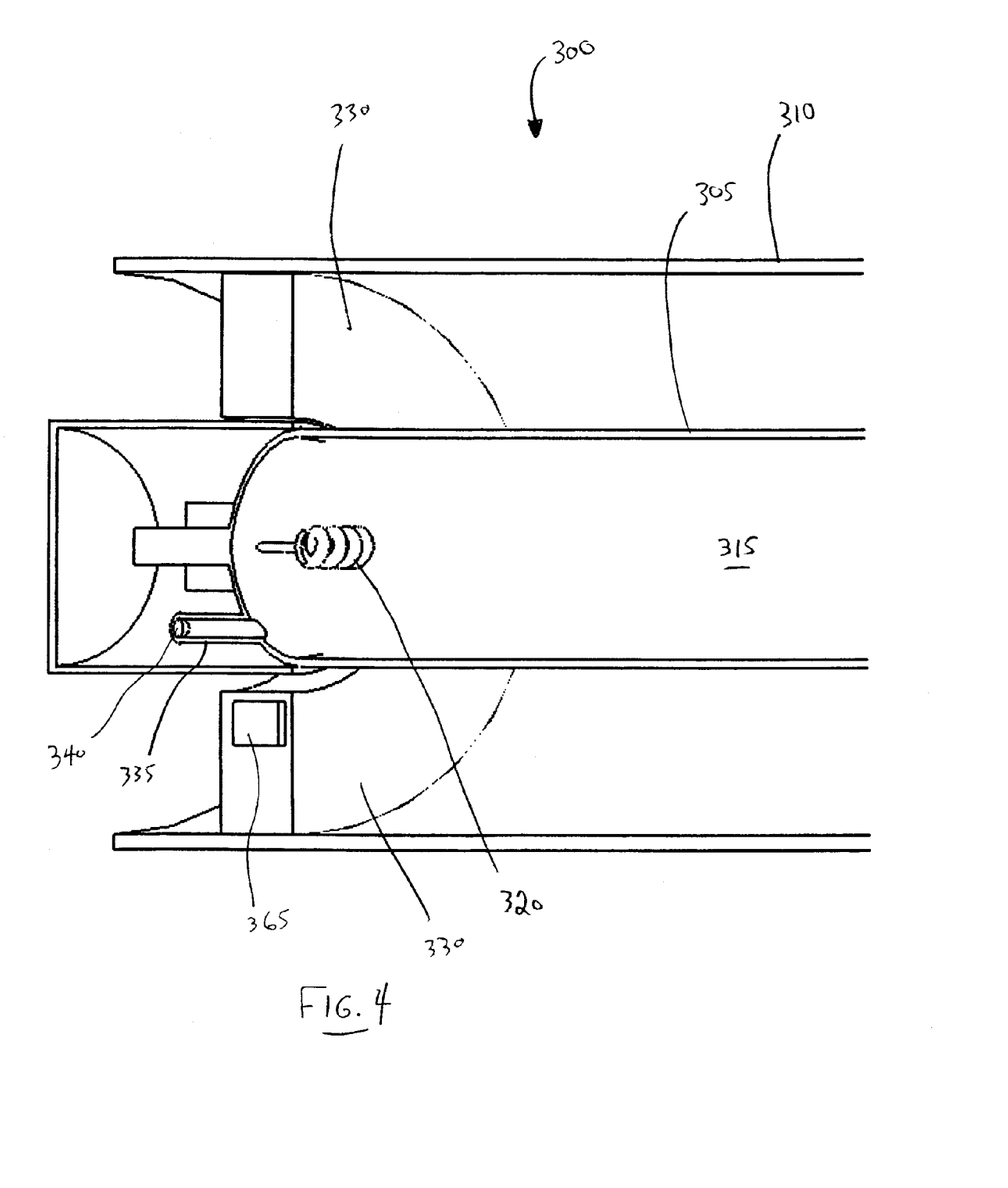
FIG. 4 illustrates an enlarged cross-sectional view of a third embodiment of the present ultraviolet radiation lamp disposed in a protective radiation transparent sleeve.
Figure 5:
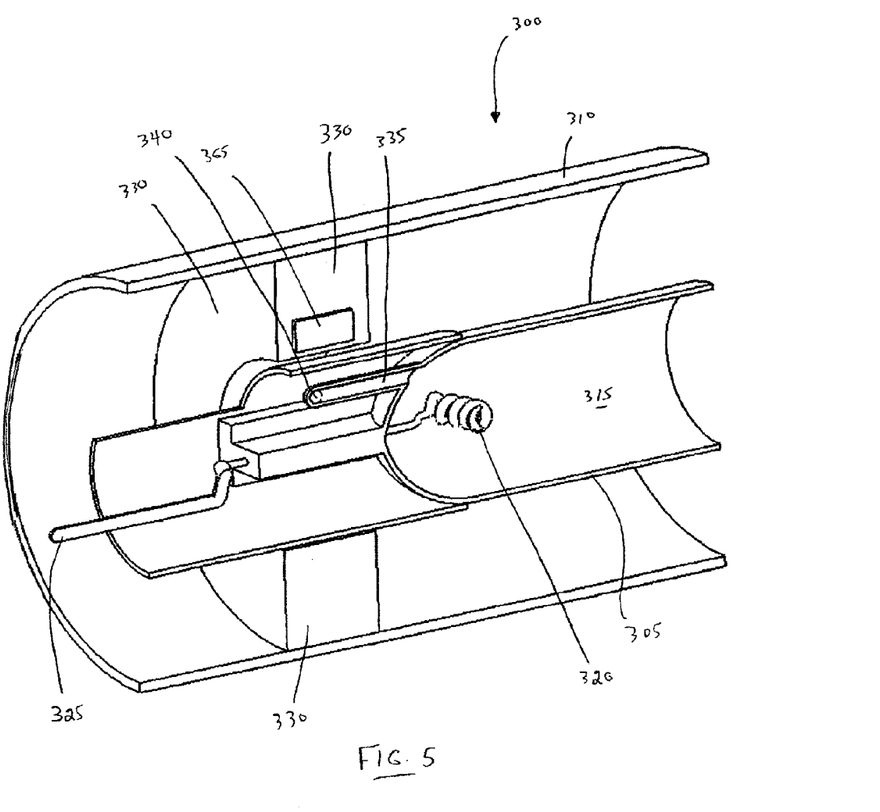
FIG. 5 illustrates an enlarged perspective view (partially cut away) of the ultraviolet radiation lamp illustrated in FIG. 4.

With reference to FIGS. 4 and 5, there is illustrated a radiation source assembly 300 comprising an ultraviolet radiation lamp 305 and a protective radiation transparent sleeve 310.

Ultraviolet radiation lamp 305 comprises a substantially sealed cavity 315. Disposed at a proximal end of cavity 315 is a filament 320 which is in electrical connection with a electrical connecting pin 325.

Also disposed at a proximal end of cavity 215 is an annular heat absorbing unit 330. The nature of heat absorbing unit 330 is not particularly restricted provided the material used for heat absorbing unit 330 is capable of conducting heat (e.g., operating as a heat sink). For example, heat absorbing unit 330 may be constructed of a material selected from the group comprising copper, aluminum, ceramic and the like.

Also disposed at the proximal end of cavity 315 is a passageway 335 in communication with cavity 315. Passageway 335 has disposed therein a mercury-containing material 340. Preferably, mercury-containing material 340 comprises mercury.

A heating element 365 is integrated in annular heat absorbing unit 330. As can be seen, heating element 365 is positioned near passageway 335 and mercury-containing material 340. Connected to heating element 365 is a pair of electrical leads (not shown).

In use, electrical connecting pin 325 may be inserted in an electrical receptacle of a conventional socket or plug (not shown). Further electrical leads (not shown) may be connected to appropriate circuitry to operate and/or control heating element 365.

The embodiment of the invention illustrated in FIGS. 4 and 5 allows lamp 305 to be inserted into an annular amalgam thermal control device. Annular heat absorbing unit 330 is partially inserted into the lamp sleeve or lamp holder. Wires (not shown) run from this device to the power supply or it can be attached to the lamp power circuit.

Radiation source assembly 300 works in the following manner.

Annular heat absorbing unit 330 is in close thermal contact to sleeve 310 and, therefore, the fluid being treated. Because of this close proximity heat can be passively removed from amalgam 340. The design of annular heat absorbing unit 330 could be as shown or it could be of any other shape. Lamp 305 does not necessarily need to be concentric with respect to sleeve 310. Any eccentric or a concentric location of lamp 305 with respect to sleeve 310 would also be possible. Annular heat absorbing unit 330 may be constructed as shown so as to provide passive cooling.

The bulk material of annular heat absorbing unit 130,230, 330 could be ceramic, but could be other materials. The basic material requirements are: adequate thermal conductivity, ability to operate at amalgam and lamp operating temperature without physical damage and no off-gas production or material degradation under the conditions which a ultraviolet lamp can provide—e.g., high UV-C levels, ozone, moisture and the like.

Heating element 365 is preferably a self-regulating heater and is placed in annular heat absorbing unit 330 near the physical location of amalgam 340 at the time lamp 305 is properly inserted into sleeve 310—i.e., during normal lamp operation.

One or more self regulating heaters can be used as heating elements 165, 265 or 365.

Preferably, each of heating elements 165, 265 and 365 is a thermistor. As is know in the art, thermistors are thermally sensitive resistors and have, according to type, a negative (NTC), or positive (PTC) resistance/temperature coefficient. A PTC thermistor is particularly preferred for use as a self-regulating heating element in the heating element of the present ultraviolet radiation lamp.

Thermistors may be manufactured from the oxides of the transition metals—e.g., manganese, cobalt, copper and nickel.

As is known in the art, NTC thermistors are temperature dependant semiconductor resistors. Operating over a range of −200° C. to +1000° C., they are supplied in glass bead, disc, chips and probe formats. NTCs may be used when a continuous change of resistance is required over a wide temperature range. They offer mechanical, thermal and electrical stability, together with a high degree of sensitivity.

PTC thermistors are temperature dependent resistors, conventionally manufactured from barium titanate and may be used when a significant change in resistance is required at a specific temperature or current level. PTCs can operate in the following modes:

Temperature sensing, switching at temperatures ranging from 60° C. to 180° C.

Solid state fuse to protect against excess current levels, ranging from several mA to several A (25° C. ambient) and continuous voltages up to 600 V and higher.

Liquid level sensor.

Also, it is possible to use a non self-regulating heater in addition to the regulating heater. In this case, the unregulated heaters do most of the amalgam heating, and the self regulating heater only "tops up" the required thermal load.

Annular heat absorbing unit 330 could be placed at either end or both ends of the lamp, to control an amalgam feature (340) located outside of the arc length (preferred embodiment). It could also be placed over the lamp, between the filaments (320), to control an amalgam spot temperature.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, while the illustrated embodiments are shown in the form of a single ended lamp (i.e., electrical connections at one end only of the lamp), it is possible to construct the present ultraviolet radiation in the form of a so-called double-ended lamp (i.e., electrical connections at opposed ends of the lamp). Such double-ended lamps are generally disclosed, for example, in U.S. Pat. No. 4,482,809 (Maarschalkerweerd). Further, while the illustrated embodiments are shown in the form of a lamp having electrical connections emanating from the so-called "pinch" of the sealed cavity, it is possible to omit the electrical connections and construct the lamp to achieve electrical connection by inductive or capacitive coupling. Still further, the specific form of heat absorbing element shown in the illustrated embodiments may be modified to suit the desired needs of the particular ultraviolet radiation lamp. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An ultraviolet radiation lamp comprising:
   (i) a substantially sealed cavity comprising a mercury-containing material and at least one electrode, the at least one electrode being connected to an electrical pin portion emanating the cavity;
   (ii) a thermal connector portion disposed exteriorly with respect to the cavity, the thermal connector portion being disposed in contact with a first portion of the cavity contacting the mercury-containing material; and
   (iii) an electrical connection plug unit releasably engageable with respect to the electrical pin portion, the electrical connection plug unit comprising (i) an electrical pin receptacle, and (ii) an electrical heating unit configured to contact the thermal connector portion when the electrical pin receptacle is engaged with to the electrical pin portion, the electrical heating unit having adjustable heat output.

2. The ultraviolet radiation lamp defined in claim 1, wherein the thermal connector portion is disposed in an annular element surrounding at least a portion of the cavity.

3. The ultraviolet radiation lamp defined in claim 2, wherein the annular element further comprises a heat absorbing element configured to contact the first portion of the cavity.

4. The ultraviolet radiation lamp defined in claim 1, wherein the electrical pin portion and the electrical connection plug unit have a substantially complementary fit.

5. The ultraviolet radiation lamp defined in claim 1, wherein the electrical heating unit comprises a thermal-conducting element for contact with the first portion of the cavity when the electrical pin portion and the electrical connection plug unit are engaged.

6. The ultraviolet radiation lamp defined in claim 1, wherein the electrical connection plug unit comprises a heat absorbing element for contact with the first portion of the cavity when the electrical pin portion and the electrical connection plug unit are engaged.

7. The ultraviolet radiation lamp defined in claim 1, wherein the first portion of the cavity comprises a substantially cylindrical passageway containing the mercury-containing material.

8. An ultraviolet radiation lamp comprising:
   (i) a substantially sealed cavity comprising a mercury-containing material;
   (ii) a substantially annular heat absorbing element disposed on the exterior of said cavity such that, during operation of the lamp, the temperature of the lamp in contact with the heat absorbing element is at a different temperature than the remainder of the lamp; and
   (iii) an electrically-powered heating unit in disposed exteriorly with respect to the cavity, the heating unit being disposed in contact with a first portion of the cavity containing the mercury-containing material, the substantially annular heating absorbing element and the heating unit being separate structural elements.

9. The ultraviolet radiation lamp defined in claim 8, wherein the heating unit comprises adjustable heat output.

10. The ultraviolet radiation lamp defined in claim 8, wherein the substantially sealed cavity comprises at least one electrode.

11. The ultraviolet radiation lamp defined in claim 10, further comprising an electrical connection unit disposed at one end of the cavity and comprising at least one electrical connector in electrical connection with the at least one electrode.

12. The ultraviolet radiation lamp defined in claim 11, wherein the electrical connection unit comprises a first connection unit disposed at one end of the lamp and a second connection unit reversibly engageable with respect to the first connection unit.

13. The ultraviolet radiation lamp defined in claim 12, wherein the heating unit is disposed in the first connection unit.

14. The ultraviolet radiation lamp defined in claim 12, wherein the heating unit is disposed in the second connection unit.

15. The ultraviolet radiation lamp defined in claim 12, wherein the first connection unit and the second connection unit have a substantially complementary fit.

16. The ultraviolet radiation lamp defined in claim 12, wherein the first connection unit comprises the heat absorbing element for contact with the first portion of the cavity when the first connection unit and the second connection unit are engaged.

17. The ultraviolet radiation lamp defined in claim 12, wherein the second connection unit comprises the heat absorbing element for contact with the first portion of the cavity when the first connection unit and the second connection unit are engaged.

18. The ultraviolet radiation lamp defined in claim 12, wherein the second connection unit comprises a receptacle portion for receiving the at least one electrical connector when the first connection unit and the connection unit are engaged.

19. The ultraviolet radiation lamp defined in claim 8, wherein the first portion of the cavity comprises the mercury-containing material.

20. The ultraviolet radiation lamp defined in claim 8, wherein the heat absorbing element and the heating unit are integrated.

21. The ultraviolet radiation lamp defined in claim 8, wherein the heat absorbing element is annular.

22. The ultraviolet radiation lamp defined in claim 8, wherein the heating unit is disposed adjacent to the mercury-containing material.

23. The ultraviolet radiation lamp defined in claim 8, wherein the heat absorbing element and the heating unit are non-integrated.

24. The ultraviolet radiation lamp defined in claim 8, wherein the heating unit comprises a heating element in direct contact with the first portion of the cavity.

25. The ultraviolet radiation lamp defined in claim 8, wherein the heating unit comprises a heating element and a heat transfer element, the heat transfer element being interposed between the heating element and the first portion of the cavity.

26. A radiation source assembly comprising the ultraviolet radiation lamp defined in claim 1 and a radiation transparent protective sleeve therefore.

27. A radiation source module comprising a first support element and at least one radiation source assembly as defined in claim 26 connected at a first end thereof to the first support element.

28. The radiation source module defined in claim 27, comprising a plurality of radiation source assemblies as defined in claim 34 connected at a first end thereof to the first support element.

29. The radiation source module defined in claim 27, further comprising a second support element to which is connected a second end of the at least one radiation source assembly.

30. A fluid treatment system comprising the radiation source assembly defined in claim 26.

31. A fluid treatment system comprising a plurality of radiation source assemblies as defined in claim 26.

32. A fluid treatment system comprising the radiation source module defined in claim 27.

33. A fluid treatment system comprising a plurality of radiation source modules as defined in claim 27.

34. The ultraviolet radiation lamp defined in claim 1, further comprising a heat sink portion different from said electrical heating unit and disposed to extract heat from the cavity.

35. The ultraviolet radiation lamp defined in claim 1, wherein the cavity comprises a passageway projecting from the cavity, and wherein the mercury-containing material is disposed within said passageway.

* * * * *